United States Patent [19]
Horvath

[11] 3,939,737
[45] Feb. 24, 1976

[54] EPICYCLIC TRANSMISSION WITH ECCENTRIC DRIVE AND THRUST-TRANSMITTING BODIES IN STATIONARY GUIDE

[75] Inventor: Eduard Horvath, Vienna, Austria

[73] Assignee: Otto Bock Orthopäedische Industrie KG, Duderstadt, Germany

[22] Filed: Mar. 12, 1974

[21] Appl. No.: 450,478

[30] Foreign Application Priority Data
Mar. 16, 1973 Austria ................ 2387/73

[52] U.S. Cl. .................................. 74/805
[51] Int. Cl.² ........................... F16H 1/28
[58] Field of Search ............. 74/805, 804, 800

[56] References Cited
UNITED STATES PATENTS

| 606,158 | 6/1898 | Belanger | 74/805 |
|---|---|---|---|
| 1,543,791 | 6/1925 | Pitter | 74/804 X |
| 1,738,662 | 12/1929 | Morison | 74/804 X |
| 2,251,167 | 7/1941 | Probst | 74/805 X |
| 2,966,078 | 12/1960 | Wright | 74/805 |
| 3,413,896 | 12/1968 | Wildhaber | 74/805 X |
| R13,853 | 12/1914 | Krohn | 74/805 X |

Primary Examiner—Samuel Scott
Assistant Examiner—John Reep
Attorney, Agent, or Firm—Karl F. Ross; Herbert Dubno

[57] ABSTRACT

An epicyclic transmission between a stationary member and a rotatable section of a prosthesis comprises a fixed ring gear secured to the stationary member, a driven ring gear of smaller diameter, and an annular planet pinion in mesh with both ring gears. The planet pinion is set in motion by a multiplicity of angularly spaced thrust-transmitting bodies, such as balls or pins, which are independently guided in apertures of an annular extension of the stationary member and bear upon an eccentric rigid with a drive shaft. The solid guide portions of this stationary extension can be used to accommodate energy-supply lines.

10 Claims, 2 Drawing Figures

EPICYCLIC TRANSMISSION WITH ECCENTRIC DRIVE AND THRUST-TRANSMITTING BODIES IN STATIONARY GUIDE

Figure 1:
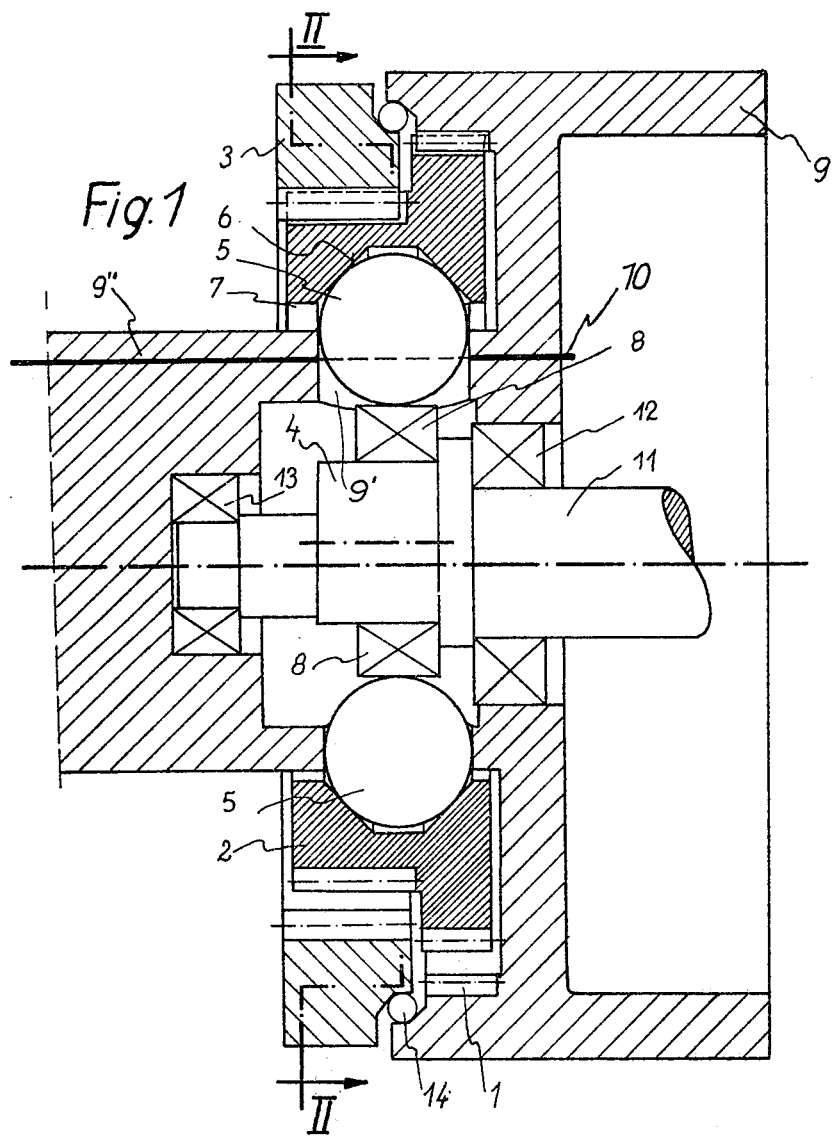
Figure 2:
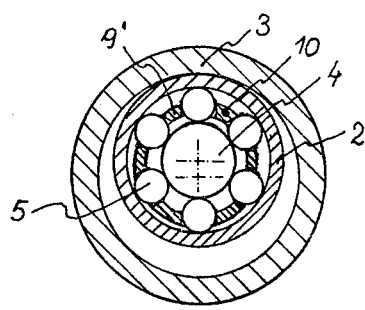

The invention will be explained more fully hereinafter with reference to an embodiment shown by way of example in the accompanying drawing, in which;

FIG. 1 is a longitudinal sectional view showing a transmission embodying the invention; and FIG. 2 is a cross-sectional view taken on line 2-2 in FIG. 1 and drawn to a smaller scale than FIG. 1.

In the drawing, I have shown an epicyclic transmission comprising a ring gear 1 which is fixed to a stationary member or housing part 9 and in mesh with an annular planet pinion 2 having a stepped outer periphery. Two sets of teeth on that periphery are in mesh with a driven ring gear 3 differing in diameter from gear 1. A planet carrier consisting of an eccentric 4 serving to drive the planet pinion 2, is mounted on a drive shaft 11 journaled by means of two bearings 12, 13 in housing part 9.

A plurality of, in the present example six, balls 5 are provided to transmit a generally radial thrust from the eccentric 4 to the planet pinion 3 upon rotation of shaft 11. The balls 5 bear from without on the eccentric 4 and from within on the planet pinion 2. Instead of the balls 5, other thrust-transmitting bodies, such as pins or the like, may be used to couple the eccentric 4 with the planet pinion 2. This causes the pinion 2 to turn as the moving eccentric 4 imparts a radial movement to the individual balls in succession resulting in rotation of gear 3 relative to gear 1 because of their meshing engagement with the teeth of the pinion. The balls 5 are guided in peripherally spaced apertures formed in a cage-like annular extension 9' of housing 9 and terminating in a boss 9''; they are also cradled in a raceway 6, on the inner periphery of pinion 2, here shown as a groove of trapezoidal cross-section whose two oblique sides form lateral guide surfaces which bracket the balls. This construction also prevents axial shifts of the planet pinion 2. The eccentric 4 might directly engage the surface of the balls 5, but, to reduce the friction, I prefer to insert a ball bearing 8 between the eccentric 4 and the balls 5 which ride on the outer race of this ball bearing. The stationary member 9, 9', 9'' may accommodate power-transmitting lines, e.g., electric lines 10, extending through the solid, stationary cage portions 9', between the balls 5 so as to remain unaffected by the moving parts of the transmission. Balls 14 may be provided to form a thrust bearing between the ring gear 3 and housing 9. The raceways for these balls are formed directly on the stationary housing 9 and on the gear 3.

What is claimed is:
1. An epicyclic transmission comprising:
    a stationary member;
    a fixed ring gear secured to said member;
    a driven ring gear coaxial with and adjacent said fixed ring gear, said ring gears being of different diameters;
    a drive shaft journaled in said member;
    an eccentric on said drive shaft offset from the axis of said ring gears;
    a multiplicity of independently movable thrust-transmitting bodies bearing generally radially upon said eccentric at peripherally spaced locations;
    stationary guide means for said bodies integral with said member; and
    a stepped annular planet pinion movably disposed between said guide means and said ring gears in meshing engagement with the latter, said pinion being internally supported by said bodies for displacement thereby upon rotation of said eccentric by said shaft with consequent relative rotation of said ring gears.

2. A transmission as defined in claim 1, further comprising anti-friction bearing means inserted between said eccentric and said bodies.

3. A transmission as defined in claim 2 wherein said bearing means comprises a ball bearing having an outer race in contact with said bodies.

4. A transmission as defined in claim 1, further comprising an energy-supply line passing generally axially from said member through said guide means past said ring gears.

5. A transmission as defined in claim 1 wherein said bodies are balls, said pinion having an inner peripheral groove with lateral surfaces bracketing said balls.

6. A transmission as defined in claim 5 wherein said guide means comprises an annular extension of said member provided with peripherally spaced apertures rotatably accommodating said balls.

7. A transmission as defined in claim 1, further comprising a thrust bearing between said ring gears.

8. In combination, a transmission as defined in claim 1 and a prosthesis having a rotatable section secured to said driven ring gear.

9. The combination defined in claim 8, further comprising circuit means extending from said member through said guide means.

10. The combination defined in claim 9 wherein said guide means comprises an annular extension of said member provided with peripherally spaced apertures accommodating said bodies, said circuit means traversing said extension between said apertures.

* * * * *